(12) United States Patent
Miyamoto et al.

(10) Patent No.: US 7,630,289 B2
(45) Date of Patent: *Dec. 8, 2009

(54) OPTICAL DISK

(75) Inventors: Harukazu Miyamoto, Higashimurayama (JP); Takahiro Kurokawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/213,762

(22) Filed: Jun. 24, 2008

(65) Prior Publication Data

US 2008/0273450 A1 Nov. 6, 2008

Related U.S. Application Data

(63) Continuation of application No. 12/149,152, filed on Apr. 28, 2008, now Pat. No. 7,518,980, which is a continuation of application No. 11/376,112, filed on Mar. 16, 2006, now Pat. No. 7,366,082, which is a continuation of application No. 10/979,171, filed on Nov. 3, 2004, now Pat. No. 7,046,616, which is a continuation of application No. 10/703,537, filed on Nov. 10, 2003, now Pat. No. 6,947,370, which is a continuation of application No. 10/183,643, filed on Jun. 28, 2002, now Pat. No. 6,690,641.

(30) Foreign Application Priority Data

Jul. 13, 2001 (JP) .............................. 2001-213038

(51) Int. Cl.
G11B 7/24 (2006.01)

(52) U.S. Cl. ................................ 369/275.4; 369/275.3

(58) Field of Classification Search ... 369/275.1–275.5, 369/59.22, 47.21, 59.1, 59.2, 13.01, 277–279, 369/53.11, 44.26, 47.31
See application file for complete search history.

(56) References Cited

U.S. PATENT DOCUMENTS 5,754,522 A 5/1998 Kobayashi et al.

(Continued)

FOREIGN PATENT DOCUMENTS

JP 61-219222 3/1985

(Continued)

*Primary Examiner*—Ali Neyzari
(74) *Attorney, Agent, or Firm*—Stites & Harbison PLLC; Juan Carlos A. Marquez, Esq.

(57) ABSTRACT

The invention provides an optical disk that enables high-speed reproduction of address signals. A wobble address system for optical disk supports various types of synchronization, such as phase synchronization, bit synchronization, word synchronization, etc., to be established easily with high detection reliability with the use of an self-orthogonal code. Thus, the invention provides a method for easily synchronizing an address signal, i.e., high-speed reproduction of the address signal. Further, by virtue of an efficient modulation system of the address signal and redundancy thereof, it becomes possible to detect address information with high reliability. This capability is particularly effective in optical recording/reproduction with a blue light source whose signal light quantity and reproduction quality are prone to reduce. Moreover, other additional data of the address data is preserved in the wobbles, which provides medium information to a rewritable optical disk without using embossed pits such that a high-reliability disk (with enhanced security) is realized with a low cost and easily.

6 Claims, 13 Drawing Sheets

WAVEFORM 0

WAVEFORM 1

U.S. PATENT DOCUMENTS

| | | |
|---|---|---|
| 6,125,100 A | 9/2000 | Sensyu |
| 6,201,778 B1 | 3/2001 | Sensyu |
| 6,542,458 B2 | 4/2003 | Miyamoto et al. |
| 6,577,590 B2 | 6/2003 | Minamino et al. |
| 6,608,810 B2 | 8/2003 | Minamino et al. |
| 6,674,700 B2 | 1/2004 | Minamino et al. |
| 6,690,641 B2 | 2/2004 | Miyamoto et al. |
| 6,757,239 B2 | 6/2004 | Minamino et al. |
| 6,947,370 B2 * | 9/2005 | Miyamoto et al. ....... 369/275.4 |
| 6,977,882 B2 | 12/2005 | Miyamoto et al. |
| 7,042,832 B2 | 5/2006 | Miyamoto et al. |
| 7,046,616 B2 * | 5/2006 | Miyamoto et al. ....... 369/275.4 |

FOREIGN PATENT DOCUMENTS

| | | |
|---|---|---|
| JP | 9-212871 | 2/1996 |
| JP | 10-91967 | 2/1997 |
| JP | 10-222874 | 2/1997 |
| JP | 10-283677 | 4/1997 |
| JP | 10-312542 | 5/1997 |
| JP | 10-320784 | 5/1997 |
| JP | 11-31365 | 7/1997 |
| JP | 2000-011384 | 6/1998 |
| JP | 2001-67678 | 9/1999 |

* cited by examiner

SYNCHRONOUS CODE A:   1 1 1 1 1 0 0 0 1 1 0 1 1 1 0 1 0 1 0 0 0 0 1 0 0 1 0 1 1 0 0

SYNCHRONOUS CODE B:   0 0 0 0 0 1 1 1 0 0 1 0 0 0 1 0 1 0 1 1 1 1 0 1 1 0 1 0 0 1 1

DATA 0:   0 0 1 0 1 0 1 1 0 0 0 0 1 1 1 0 0 1 1 0 1 1 1 1 1 0 1 0 0 0 1

DATA 1:   1 1 0 1 0 1 0 0 1 1 1 1 0 0 0 1 1 0 0 1 0 0 0 0 0 1 0 1 1 1 0

```
31-BIT M-SEQUENCE

SYNCHRONOUS CODE :  1111100011011101010000100101100

DATA 0 :  0010101100001100110111110100001

DATA 1 :  0001010110100001100100111110111
```

TWO-PHASE CODING

```
SYNCHRONOUS CODE :  1010101010010110100110101001100101010011001101010101

DATA 0 :  0101100110101001010101101010100110101010101001010110

DATA 1 :  0101011001100110101010010110011001010101010100011010
```

OPTICAL DISK

CROSS REFERENCE TO RELATED APPLICATIONS

This application is a Continuation application of nonprovisional U.S. Ser. No. 12/149,152 filed on Apr. 28, 2008 now U.S. Pat. No. 7,518,980, which is a Continuation application of nonprovisional U.S. Ser. No. 11/376,112 filed on Mar. 16, 2006 now U.S. Pat. No. 7,366,082, which is a Continuation application of nonprovisional U.S. Ser. No. 10/979,171 filed on Nov. 3, 2004 now U.S. Pat. No. 7,046,616, which is a Continuation of U.S. Ser. No. 10/703,537 filed on Nov. 10, 2003 now U.S. Pat. No. 6,947,370, which is a Continuation of U.S. Ser. No. 10/183,643 filed on Jun. 28, 2002 now U.S. Pat. No. 6,690,641. Priority is claimed based upon U.S. application Ser. No. 12/149,152 filed on Apr. 28, 2008, which claims the priority date of U.S. application Ser. No. 11/376,112 filed on Mar. 16, 2006, which claims the priority date of U.S. application Ser. No. 10/979,171 filed on Nov. 3, 2004, which claims the priority date of U.S. application Ser. No. 10/703,537 filed on Nov. 10, 2003, which claims the priority date of U.S. application Ser. No. 10/183,643 filed on Jun. 28, 2002, which claims the priority date of Japanese Patent Application 2001-213038 filed on Jul. 13, 2001, all of which is incorporated by reference.

FIELD OF THE INVENTION

The present invention relates to a recording format for a high-capacity rewritable optical disk, more specifically to a method for arranging and preserving addresses of recording area identification information, namely the addresses on the optical disk whose groove portions or land portions are allocated as recording tracks.

BACKGROUND OF THE INVENTION

An example of the track configuration of the conventional optical disk will be described referring to FIG. 16. A plurality of groove tracks 11 and land tracks 12 are arranged alternately in a radial direction of a disk-like recording medium. Each track is wobbled by a small amount in the radial direction. Further, each track is divided into a plurality of circular arc sectors that are arranged in the radial direction, and in a leading part of each circular arc sector, a header 6 having address information used for identifying a recording area is placed. The headers 6 are arranged in the radial directions, i.e., are placed on radial lines. In this example, a width of each track is approximately 0.6 µm and a groove depth of each groove portion is approximately 60 nm. In this example, a length of the sector is approximately 6 mm, which corresponds to a user capacity of 2048 bytes. Each groove portion and each land portion are wobbled by amplitude of approximately 20 nm in the radial direction. The period of the wobble is set at 1/232 times of the sector length, namely, approximately 25 µm. This ratio 1:232 is chosen to correspond the period of the wobble to integral multiples of the length of the record data (channel bit length) such that a recording clock can easily be generated from the wobbles.

FIG. 16 shows details of a sector address header portion in a leading part of the track, namely, an identification information portion. In FIG. 16, pieces of the identification information are placed at two positions, a first position 631 and a second position 632, that are aligned in the radial direction, on the radial lines. The track connects to an immediately previous/subsequent track when making a round, i.e., the groove portion 11 to the groove portion 11 and the land portion 12 to the land portion 12. In this example, each identification information item corresponds to a recording area of an information track at its right. Further, identification information corresponding to the groove part information track 3 is placed at a first position 631, and the identification information corresponding to the inter-groove part information track 4 is placed at a second position 632. That is, pieces of the identification information are placed in such a way that the position thereof along the information track is different from those of adjacent tracks but agree with those of adjacent-but-one tracks. That is, when viewing on boundary lines between the land track and the groove track, the placement position of the identification information is divided into first and second areas, and the first and second identification information areas are used alternately one track by one track.

By this arrangement, for example, when the light spot 21 is scanned on the groove portion 11, the pits on the one boundary line are always reproduced to avoid the crosstalk among one track and the adjacent tracks. Therefore, it becomes possible that the address information placed on the prepits is reproduced without crosstalk. In this example, the address information of the prepits is recorded with an {fraction (8/16)} modulation code (channel bit length=0.14 µm).

The identification information in the header part is composed of small dimples (pits), which are formed due to the unevenness of a substrate or the like together with the grooves etc. when the disk is fabricated.

A phase change type recording film (GeSbTe) is used as a recording film, and a record mark is shaped as an amorphous region.

The foregoing conventional example is described in detail, for example, in Japanese Patent No. 2856390, etc.

However, in applying the above-mentioned conventional technique to high-density recording where recording/reproduction is performed with a blue light source, it was difficult to form small embossed pits in the header parts. Further, the efficiency of the recording track (format efficiency) is reduced because the header part has no grooves and cannot be used as a recording area. Therefore, the prior art is disadvantageous in realizing large capacity in the optical disk.

Another example of conventional methods for recording the address information by means of the wobbles of the groove portion without performing the recording at the sector address header part is described in the international standard ISO/IEC 16969.

In this example, the wobble groove that was frequency-modulated is used in order to record the address data. One round of the disk is composed of about 3,000 wobbles, and 7.5 periods of the wobbles are used to express one bit of the address data. To express bit "1," 4 periods of the 7.5 periods are specified as the first half and the other 3.5 periods are specified as the second half. In other words, the first half is the wobbles of a high frequency and the second half is the wobbles of a low frequency. The frequency ratio is set at 8 to 7. Conversely, bit "0" is expressed by the 3.5-period low-frequency wobbles for the first half, and the 4-period high frequency wobbles for the second half. A set of 48 address bits forms an address codeword. 14 bits of the 48 bits of the address codeword are parities for error detection and the leading 4 bits are synchronization information used for establishing synchronization with this codeword. The breakdown of these four bits includes 30 periods of the wobbles (4.times.7.5), i.e., 12-period high-frequency wobbles, 3.5-period low-frequency wobbles, 4-period high-frequency wobbles, and 10.5-period low-frequency wobbles. The synchronization information can be identified from other data due to the fact that, in the synchronization information, wobbles of the same frequency longer than that of normal address bits by 4 periods or 3.5 periods whereas in a boundary of the normal address bits, wobbles of the same frequency only at 8-period (high-frequency) or 7-period (low-frequency) at most.

However, in the above-mentioned conventional technique, 1 address bit of the address data is expressed by 7.5-period wobbles and the difference in frequency between the first half part and the second half part is not large such that it is difficult to detect a boundary between the first half part and the second half part with high precision by increments of one unit of the wobble period based upon these wobbles. Further, since the synchronization information does not differ so much from other address bits, it is highly likely to be detected mistakenly. Moreover, the parity in the address codeword is 14 bits at most, which is sufficient only for checking errors but not for correcting errors such that the address information can not be reproduced if 1 bit in the address codeword is mistakenly detected It is necessary to secure sufficient S/N of the medium in order to ensure the reliability of address reproduction. When trying to apply this method to the high-density disk that needs the blue light source for reproduction, it is especially difficult to secure sufficient S/N because of the reduced efficiency of blue light detectors.

The first object of the present invention is to provide a high-performance optical disk such that the synchronization can be established easily for the address signal thereof so as to reproduce the address signal at a high speed.

The second object of the present invention is to provide an optical disk in which the address information that can be detected with high reliability.

The third object of the present invention is to provide a method for giving necessary medium information to the rewritable optical disk without using the embossed pits that are difficult to form.

SUMMARY OF THE INVENTION

To achieve the objects of the present invention, the following means were used.

(1) In a proposed optical disk, at least one of a groove group including a plurality of grooves and an inter-groove group including a plurality of lands defined by the grooves in the form of a spiral or concentric circles constitutes an information recording area. The optical disk is shaped in the following way. Either the groove group or the inter-groove group is displaced by a small amount in the radial direction according to a combined waveform formed by merging at least a synchronous component of a constant frequency that is not modulated and a signal component that is modulated according to the address data to be recorded in the information recording area.

The small displacement of the grooves, or the lands is usually called the wobble, and a waveform of this wobble can be easily detected by a signal tracking detector (e.g., a push-pull detector etc.). There are an unmodulated component and a modulated component in a detected wobble signal. By using the unmodulated component, disk rotation velocity control and phase synchronization between the phase locked loop (PPL) clock and the reproduced signal can be conducted, and by using the modulated component, the address information can be easily reproduced.

(2) It is specified that a frequency band of the modulated component does not overlap the constant frequency of the unmodulated component.

For example, a waveform made by superposing of an unmodulated fundamental wave and a second harmonic wave that is phase-modulated by 180 degrees so as to easily separate the unmodulated component and the address information and surely detect both signals based upon their frequency difference with a bandpass filter, etc. As such, the first object of the present invention is achieved.

(3) It is recommended that the unmodulated component and the address information are combined in a time-division multiplexing manner such that a period of the combined waveform is equal to or larger than a period of the wobbles and both components have substantially equal periods in time domain.

For example, the unmodulated component is allocated to a front edge of the wobble and the modulated component is allocated to a rear edge thereof. By this arrangement, the synchronization can is performed stably with a PLL circuit for selectively detecting only the front edge and the address information can be obtained by detecting a position of the rear edge.

As another example, a waveform consisting of three edges as a set may be used, wherein one edge remains unmodulated and the other two edges are phase-modulated. Further, as yet another example, the waveform may be composed such a way that a degree of modulation is varied continuously from a modulated part (100%) to an unmodulated part (0%) such that the modulated part and the unmodulated part are allocated alternately and periodically.

In any cases, since the phase synchronization information can be obtained stably by extracting the unmodulated signal component, regardless of the address information, fast synchronization at the time of accessing becomes possible. As such, the first object of the present invention is achieved.

(4) In a proposed optical disk, at least one of a groove group and an inter-groove group in the form of a spiral or concentric circles is allocated as an information recording area. At least one of the groove group and the inter-groove group is wobbled in the radial direction. Pieces of information in the form of binary data or otherwise are assigned to plural kinds of unit wobble waveforms of a constant length. Further, a plurality of said unit wobble waveforms are placed to form a wobble sequence. One bit of the address data or the user data is expressed by at least two kinds of wobble sequences with different arrangements.

For examples, waveforms such as those shown in FIG. 1(a) are used as the plurality of wobble waveforms and one bit of the address data is expressed by a wobble sequence formed by arranging a plurality of these waveforms. In this case, it is recommended that each of plural kinds of wobble sequences be made to be as different as possible (that is, they are made to be mutually different in a plurality of unit wobble waveforms). This is because, if there are many differences between the wobble sequences, even when some of unit wobbles cannot be detected due to an error, such as one caused by defect, the whole reproduced wobble sequence is checked to find which wobble sequence is closest to the original such that the wobble sequence thus chosen is assumed to be the reproduced address data. The larger the difference among the wobble sequences, the more the acceptable number of the mistakenly detected wobbles. Further, a longer wobble sequence (a wobble sequence having a larger number of unit wobble waveforms in it) has higher resistance against erroneous detection. That is, the second object of the present invention is achieved.

(5) The wobble sequence is specified to be in an arrangement that exhibits strong autocorrelation, i.e., selfcorrelation, for a shift by one length or more of the unit wobble waveform.

The strong selfcorrelation has the following property. When the wobble sequence is collated with a wobble sequence generated by shifting (shifting cyclically) per one or more unit wobble waveforms, all the unit wobbles naturally show agreements. The number of agreements is reduced even when there is a slightest shift.

As a wobble sequence having the above property, there is a wobble sequence that can be obtained by allocating different unit wobble waveforms to "0" and "1" of a maximum period sequence (M-sequence) which length is limited by the total number of available registers.

A wobble sequence exhibiting strong selfcorrelation can make the PLL circuit synchronize with the reproduced signal accurately with a deviation of less than the length of one unit wobble waveform. If the synchronization to the unit wobble waveform is established by PLL, etc., the synchronization for the unit of 1 bit of the wobble data can be executed for the unit of 1 clock of the phase lock loop (PLL). That is, the first object of the present invention is achieved.

If a plurality of wobble sequences are used to express the address bit, the cross-correlation between different wobble sequences (including a shifted sequence) is preferably as low as possible. That is, it is undesirable to choose a wobble sequence that is susceptible to be mistaken as a different wobble sequence to establish erroneous synchronization. Preferably, the wobble sequence is selected such that the degree of the cross-correlation is kept two-thirds or less of the degree of selfcorrelation.

(6) In a proposed optical disk, at least one of a groove group and an inter-groove group in the form of a spiral or concentric circles constitutes an information recording area. At least one of the groove group and the inter-groove group is wobbled in the radial direction. A plurality of wobbles form the address codeword used for identifying the information recording area. Further, a plurality of wobble sequences for synchronization are placed in the said address codeword (In a proposed optical disk, at least one of a groove group and an inter-groove group in the form of a spiral or concentric circles constitutes an information recording area. At least one of the groove group and the inter-groove group is wobbled in the radial direction. A plurality of wobbles form the address codeword used for identifying the recording area, and the address code is divided and placed in a plurality of synchronization frames that are partitioned by the wobble sequences used for synchronization.

The above means can establish synchronization in a time period shorter than that is required to reproduce the address codeword itself. As such, the second object of the present invention is achieved.

Further, since plural pieces of synchronization information are placed in a single codeword, redundancy is provided for the synchronization information itself such that, the reliability against loss and erroneous detection of the synchronization information is ensured. Moreover, even if synchronization is lost or tracking error occurs, its information can be detected in a shorter time so as to ensure high reliability. Here a desirable arrangement is described.

(8) Preferably, the above-mentioned wobble sequence used for synchronization is composed of plural kinds of arrangements, and preferably such plural kinds of sequences are placed so that their positions in the address codeword can be specified with the difference in order or with the arrangement of the plural kinds of wobble sequences placed in the address codeword.

In other words, it is desirable that the synchronization information is not of one kind but of plural kinds and pieces of the synchronization information are placed in the codeword so as to be different according to its position therein. With this condition, the synchronization of the codeword can be established by reproducing part of plural pieces of synchronization information in the codeword.

(9) In a proposed optical disk, at least one of a groove group and an inter-groove group in the form of a spiral or concentric circles constitutes an information recording area. At least one of the groove group or the inter-groove group is wobbled in the radial direction. A plurality of wobbles form the address codeword used for identifying the recording area. Additional data other than the address information may be placed in the said address codeword. Further, plural pieces of additional data placed in a plurality of address codewords are integrated to form a code block for correcting errors of the additional data.

By this arrangement, necessary medium information etc. can be provided to the rewritable optical disk without using the embossed pits that are difficult to form. As such, the third object of the present invention can be achieved. In this case, since the additional information is added with an error correction code, information can be surely reproduced even via a medium with a defect.

(10) The disk stores, as the above-mentioned additional data, control information for protecting the data or cryptographic key information for restricting accesses when the data is being recorded or reproduced; or

(11) The optical disk stores control information specifying a type of disk and characteristics thereof as the above-mentioned additional data.

These are pieces of information that are hitherto recorded using embossed data in the prior art, but the present invention provides the same benefits without using the embossed data so as to provide inexpensive disks.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

Embodiment 1

Figure 1A:
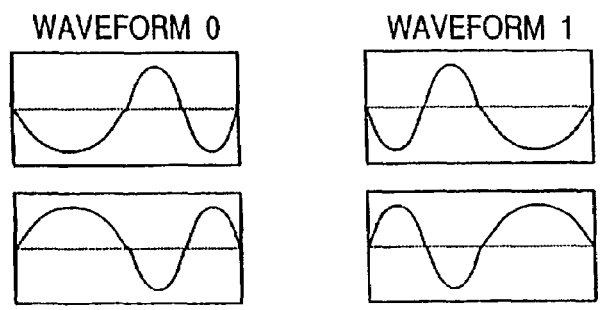
FIGS. 1(*a*) to 1(*c*) show one embodiment of the wobble waveform according to the present invention and a partially enlarged view of the optical disk for the present invention.
Figure 1B:
Figure 1C:
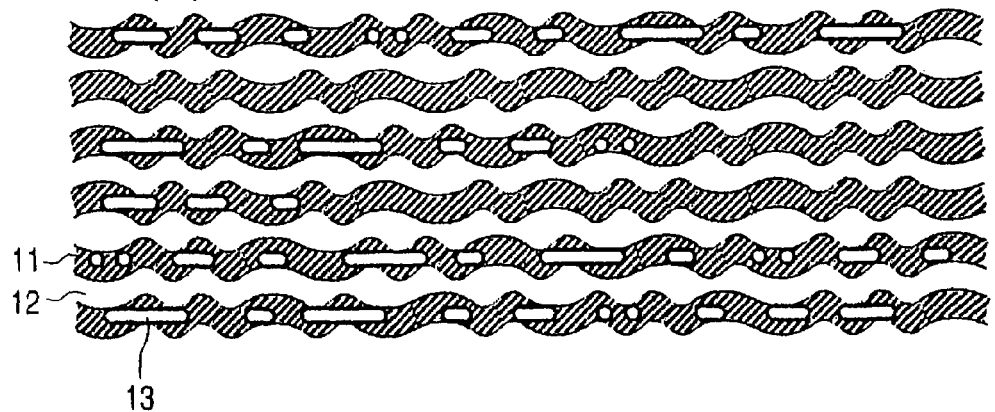

FIG. 1(c) is an enlarged partial view of the optical disk according to one embodiment of the present invention. The information track is composed of a groove 11 provided in a spiral manner on a disk-shaped substrate. Information is not recorded on a land 12 in this embodiment. The track spacing (the distance between centers of adjacent grooves) is 0.32 μm. The groove is provided on the substrate and the depth of the groove is approximately 20 nm. It is assumed that the recording/reproduction is performed with an optical head whose wavelength is approximately 405 nm with a plurality of apertures of approximately 0.85 (as defined by the ratio of the lens aperture size and the focus length) in this embodiment. As such, this groove depth of 20 nm is almost equal to an optical distance of 1/12 times wavelength. The grooved portion is wobbled in the radial direction by amplitude of about 15 nm. The wobble is recorded in sequence as shown in FIG. 1(c) corresponding to a waveform as shown in FIG. 1(b) which is formed by incorporating four kinds of unit wobble waveforms shown in FIG. 1(a). As shown in FIG. 1(b), when the waveforms are joined together, either of the waveforms in the upper and lower ranks of FIG. 1(a) is selected such that the phase of the waveforms at a joining position is consecutive. FIG. 1(c), illustrates, shortening the period of the wobble to exaggerate the amplitude of the wobble in the radial direction (the wobble amplitude is actually only about 5% of the track width).

The length of the unit wobble waveform of FIG. 1(a) is equivalent to 72 channel bits of the recorded data. In this embodiment, the bit length of user data is approximately 0.11 μm and a run length limited (RLL) (1,7) code channel is used. The channel bit length is 0.073 μm. Therefore, the length of the unit wobble waveform is approximately 5.2 μm.

Further, the unit wobble waveform is composed of one period of a high-frequency component and half of a period of a low-frequency component, wherein frequency ratio of the high-frequency component and the low-frequency component are set at 2:1. The characteristic of the wobble in this embodiment is that the unit wobble waveform always comprises a wobble waveform of 1.5 periods. Therefore, a carrier signal with 1.5 times the length of the unit wobble waveform is easily reproduced.

Figures 6, 7:
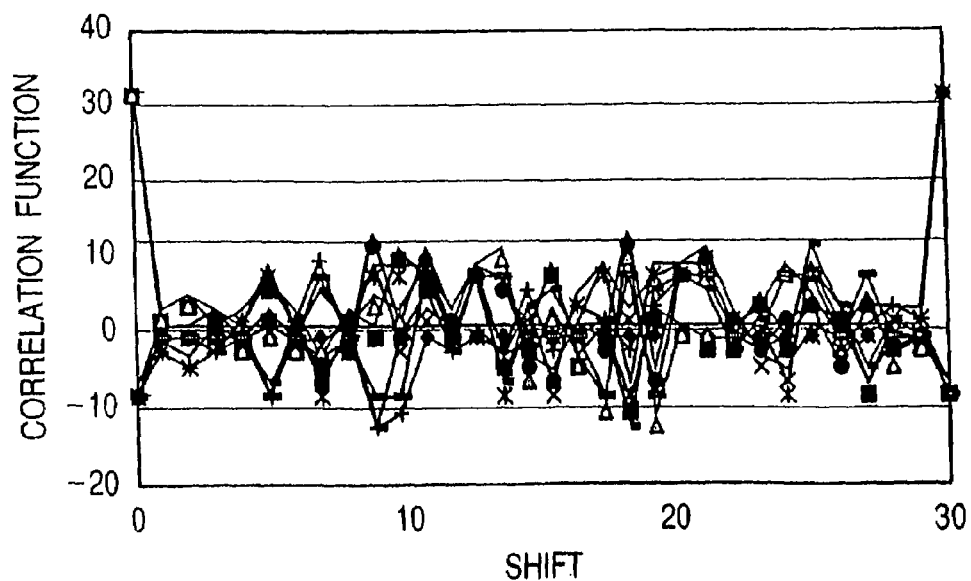
FIG. 6 shows an example of compositions of the wobble sequences according to the present invention.
FIG. 7 shows selfcorrelation functions and cross-correlation functions of the wobble sequences according to the present invention.

FIG. 6 is a table showing the wobble sequence corresponding to the address data and a synchronization queue. In the figure, "1" and "0" correspond to a waveform 1 and a waveform 0 of FIG. 1, respectively. A synchronization code A is specified to be a maximum period sequence (M-sequence) of a 31-bit length generated by a shift register of 5 bits, and a synchronous code B is a complementary sequence of the synchronous code A. Further, data "0" is another M-sequence of a 31-bit length, and data "1" is its complementary sequence.

The selfcorrelation functions and the cross-correlation functions of these four sequences in FIG. 6 are shown in FIG. 7. In finding these correlation functions, the bit product of two sequences is set at 1 when corresponding bits are in agreement and set at −1 when they are in disagreement, and the bit products are summed up for the length of the sequences. The selfcorrelation functions take on a value of 31 at shifts (between an address bit symbol and a reproduced sequence) of 0 and 31 bits. The selfcorrelation functions at other shifts and the cross-correlation functions at all shifts take on values not more than 11. The correlation function=/(the number of agreements)−(the number of disagreements). The correlation function is 11 or less means that the number of agreements is 21 or less and the number of disagreements is 10 or more. In other words, there are disagreements in ten unit wobbles or more (number of unmatched wobbles) in the all cases except when the sequence is compared with itself. It is easy to establish the synchronization for the unit of 31 bits by utilizing the correlation. To establish the synchronization, what is required therefor is to check the correlation. A circuit (to be described later) shown in FIG. 12 is used to check the correlation functions for every wobble shifts each differing by 1 unit wobble, and to determine the synchronization to be established. For example, when the correlation function marks 27 or more, since the maximum of the correlation function is 31, the disagreement of up to (31−27)/2=2 bits are allowed in establishing the synchronization. In this example, even if two of 31 unit wobbles cannot be normally detected, the synchronization of the address bit can be established. On the other hand, if the synchronization is mistakenly determined to have been established when the synchronization has not been done, the error is restricted to (27−11)/2=8 bits or more at the same time. If erroneous detection probability of the unit wobble is 1% (in reality, the erroneous detection probability is 0.1% or less), the probability of a correlation function value not being 31 is approximately 27%, whereas the probability of errors occurring in 2 bits or more becomes as considerably low as 0.3% or so. The probability of the synchronization to be mistakenly determined as being established is as low as $10^{-4}$ (0.01%) or less, which turns into a level that does not cause any problem at all in practical applications.

Figure 8:
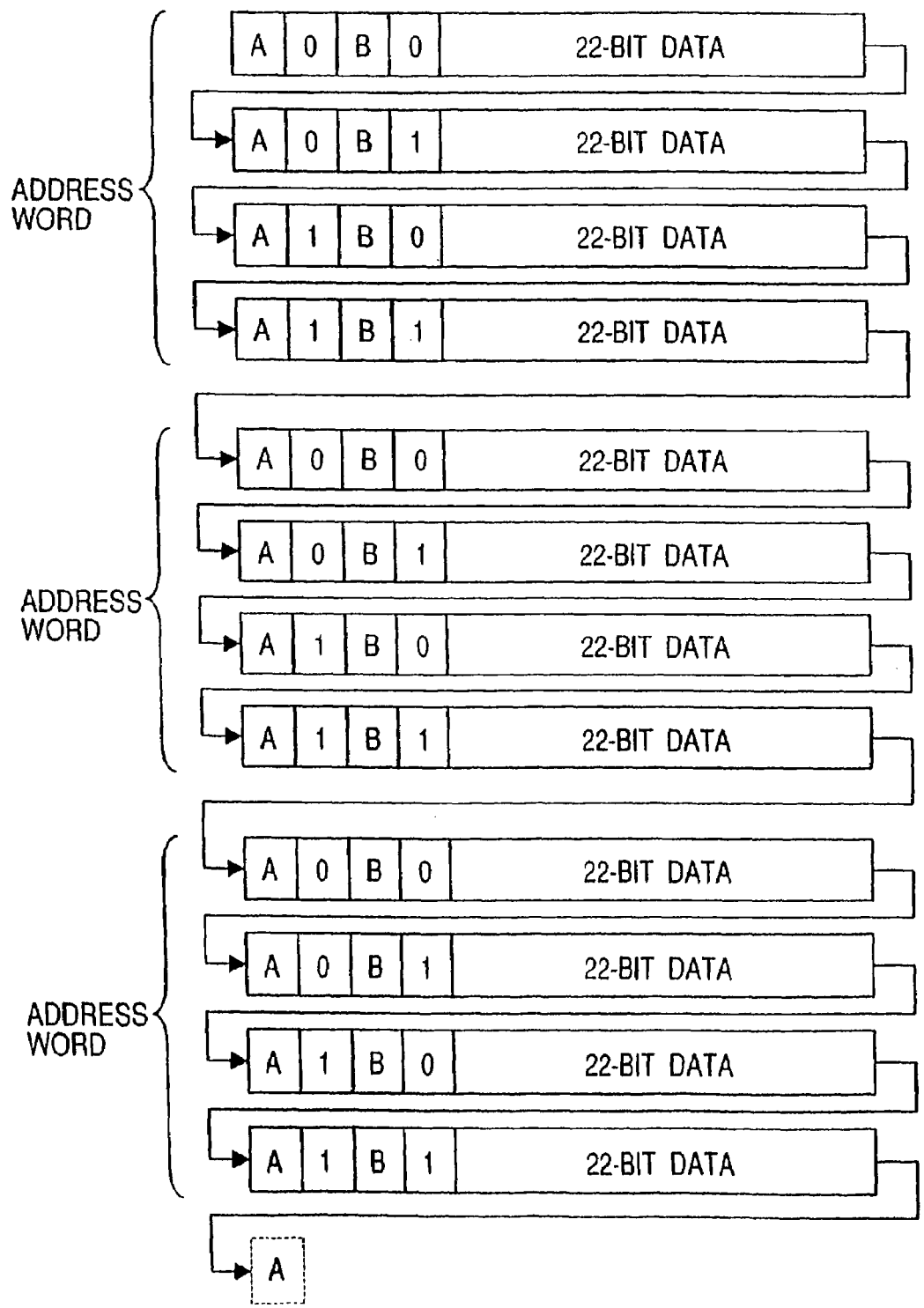
FIG. 8 shows a composition of the synchronous frame according to the present invention.

The address data bits and the synchronous codes A, B each consisting of 31 unit wobble waveforms as described above are placed, as shown in FIG. 8, to form the address codeword (address word). FIG. 8 shows three address words, wherein each address word is composed of four synchronous frames each having the length of 26 address bits. Arrows in the figure show an order of the arrangement on the recording medium. Each synchronous frame is recorded by placing the synchronous codes A and B of FIG. 6 in the leading part (at the first bit) and at the third bit, respectively, and placing the code sequences whose frame identification numbers are the data 0 and of the data 1 of FIG. 6 at the second bit and at the fourth bit, respectively. Remaining 22 bits are used for actual (address) data in this example. Based upon the synchronous codes and identification codes, one of 8 synchronous codes is detected, one of 4 identification numbers is allocated to the second bit, and another one of the 4 identification numbers is allocated to the fourth bit. A position in the address word is ascertained when the detection of these synchronous codes occurs. That is, synchronization is established according to the address word. In this embodiment, there is sufficient redundancy of the data (the wobble sequence) to establish the synchronization. The synchronization can therefore be established even in the system using the blue light source with which no sufficient S/N is ensured.

In this embodiment, the synchronous codes A and B are allocated in the leading part of respective synchronous frames. Alternatively, the synchronous code A can be located in the leading part, and the synchronous code B in a middle part of the synchronous frame such that even if the tracking error occurs during the recording/reproduction, the loss of synchronization can be detected quickly.

Figure 9:
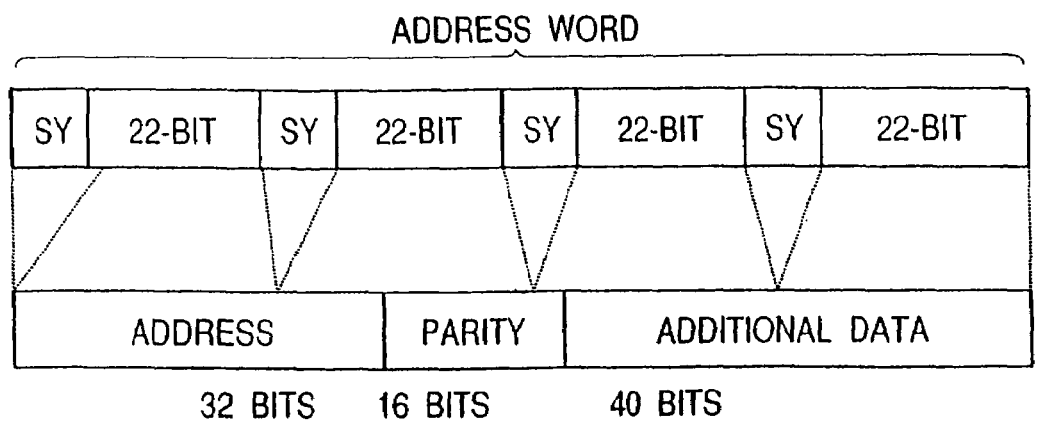
FIG. 9 shows a composition of the address codeword according to the present invention.

FIG. 9 shows an arrangement of the data in the address word. As shown in FIG. 8, each address word is composed of 4 synchronous frames each of which comprises a set of a 4-bit synchronous code and 22-bit address data. The data for address information becomes 88 bits consisting of summation of four of these 22-bit parts, i.e., 11 bytes. In this embodiment, the leading 4 bytes (32 bits) of these are assigned to the address number, and 2 bytes (16 bits) are assigned to the parity (check code) for checking whether the address number is normally detected. This check code is added only to the 4 bytes of the address number, a Reed-Solomon code with a unit of 8-bit symbols. The probability for mistakenly detecting the address number is significantly reduced with this check code to about one 60-thousandth, which is sufficiently small for any practical applications. The additional data comprises five bytes of each address code.

Figure 10:
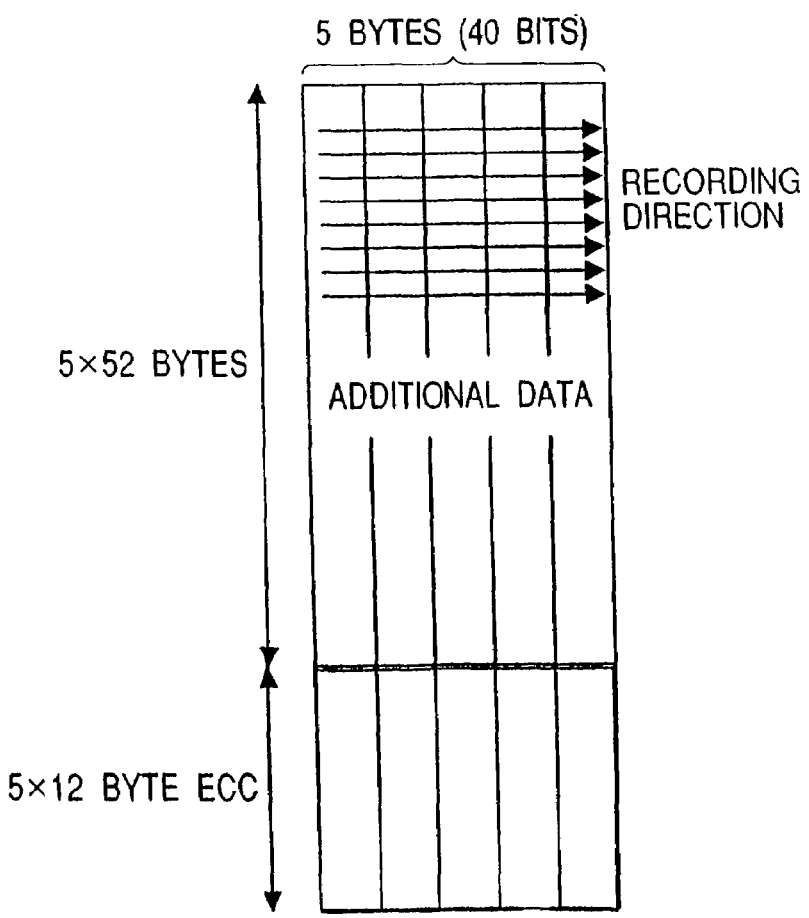
FIG. 10 shows a composition of an error correction block for the additional data according to the present invention.

In this embodiment, the additional data associated with 64 address words in total are made into a set to form the error correction block as shown in FIG. 10. Thus, the error correction code ("ECC") of 5.times.12=60 bytes is added to the data of 5.times.52=260 bytes for correcting a burst error extending over up to 6 address codes. The reliability of the reproduction of the additional data is sufficiently ensured.

In the above-mentioned example, 1 address codeword includes the user data of 72.times.31.times.26.times.4=232128 channel bits. For a format efficiency of about 85%, it occupies a length of about 16 KB of the user data.

Embodiment 2

Figure 11:
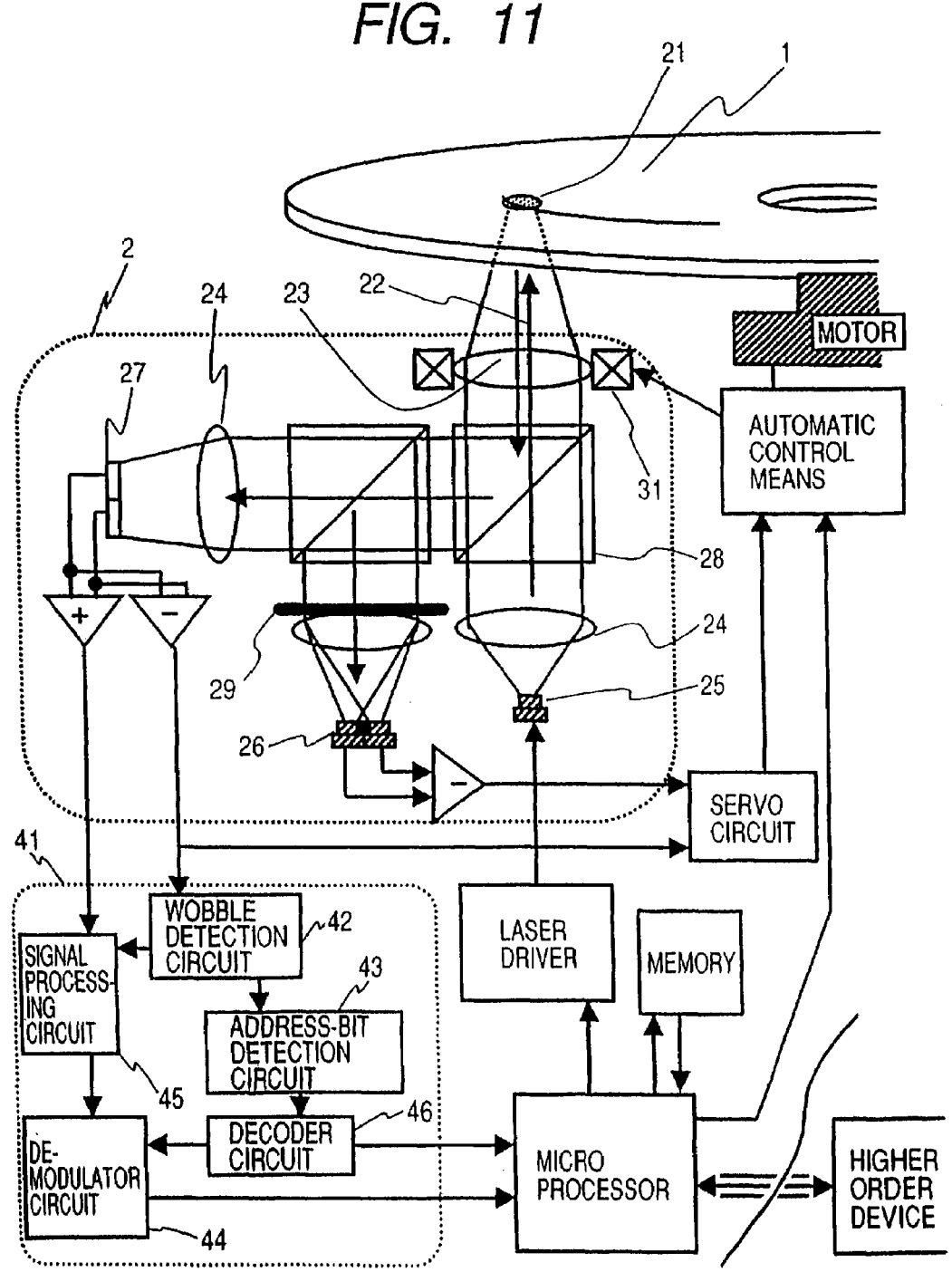
FIG. 11 shows a block diagram of a recording/reproduction system of the optical disk according to the present invention.

An example of an optical recording and reproducing apparatus that uses the optical disk according to the embodiment 1 will be described referring to FIG. 11. FIG. 11 is a block diagram of the optical recording and reproducing apparatus that employs an optical recording format according to the present invention. Light emitted from a laser light source 25 (wavelength is approximately 405 nm in this embodiment) that constitutes a part of the optical head 2 is collimated into a virtually parallel beam 22 through a collimator lens 24. The light beam 22 is irradiated on the optical disk 11 through an objective lens 23 to form a spot 21, and subsequently guided to a servo detector 26 and a partition detector 27 through a beam splitter 28 and, a holographic element 29, etc. Signals from the detectors undergo addition and subtraction to become a tracking error signal and a focus error signal, which are input into the servo circuit. Based on the obtained tracking error signal and focus error signal, the servo circuit controls positions of the objective lens 23 and of the optical head 2 so as to position the optical spot 21 at a target recording/reproduction area. The addition signal of the detector 27 is input to a signal reproduction block 41 to be processed for filtering, frequency equalization, and subsequently for digitizing by a signal processing circuit. Wobble information of the grooves (i.e., the grooved portion) is detected as a differential signal from the partition detector 27 and is input to a wobble detection circuit 42 of the signal reproduction block 41. The wobble detection circuit 42 generates a clock synchronizing with the wobble signal to function as a discriminator of the wobble waveform.

Figure 12A:
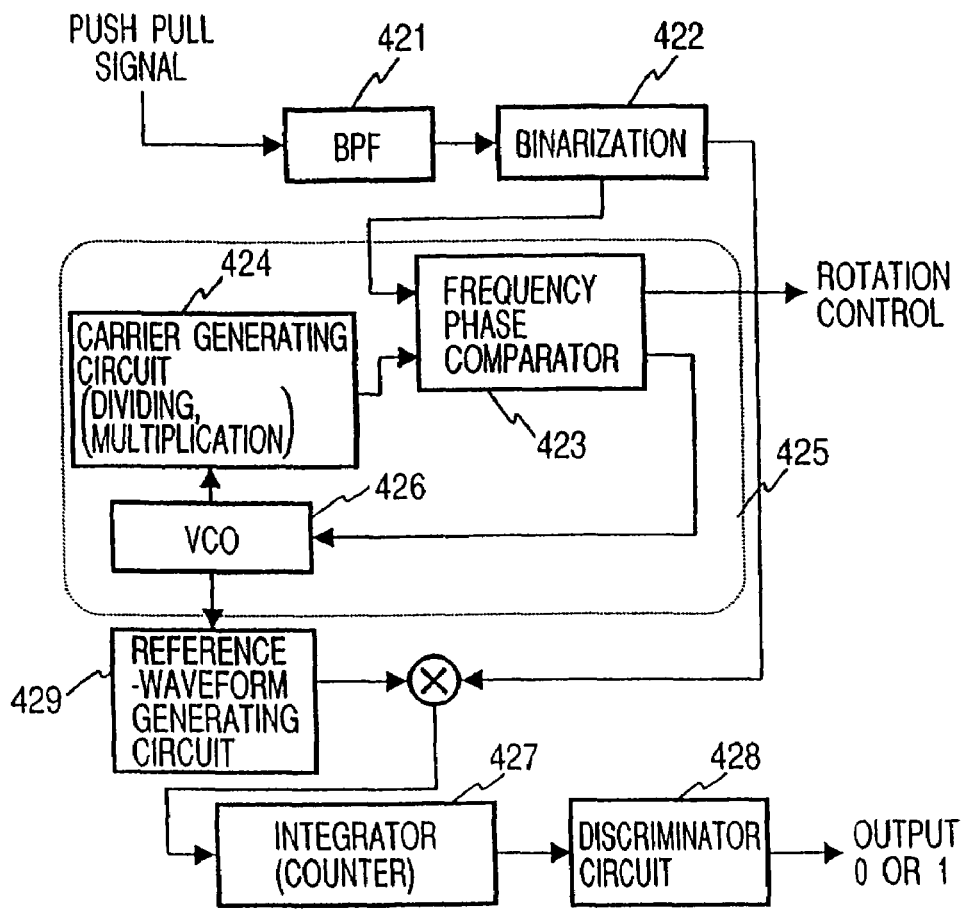
FIGS. 12(a) and 12(b) show an example of a wobble detection circuit according to the present invention.

An example of the internal configuration of the wobble-signal detecting circuit is shown in FIG. 12(a). The differential signal (push-pull signal) from the partition detector 27 is first input to a bandpass filter 421, where a signal band thereof is extracted. The filtered signal is then input to a binarization circuit 422 and is binarized.

The binarized signal is input to a PLL circuit 425. The PLL circuit 425 is composed of a voltage controlled oscillator (VCO) 426, a carrier signal generating circuit (frequency divider/multiplier circuit) 424, and a frequency phase comparator 423. In this embodiment, the VCO 426 is oscillated at a frequency of the channel clock and the frequency is divided by 72.div.1.5=48 in the frequency divider 424 to generate a carrier signal. The carrier signal is compared with the binarized signal for phase and frequency. Based on the comparison results, the rotation number of the optical disk and the oscillation frequency of the VCO 426 are controlled. Consequently, the carrier signal in synchronization with the wobble signal is generated.

The unit wobble waveforms (all consisting of 1.5 periods) of FIG. 1 are, as described above, of 72 channel clocks and hence the average period of the wobble is of 48 channel clocks. The length of a unit wobble waveform is set to be of 72 channel clocks by synchronizing with every 48th channel clock whose frequency is divided by 48. In other words, the average frequency of the unit wobble waveforms equals to the channel clock frequency divided by 48.

In a reference-wave generating circuit 429, a waveform formed by binarizing the waveform on the upper left hand side of FIG. 1(a) is used as a reference waveform. An exclusive-OR operation is performed on every bit of this reference waveform and the binarized wobble signal to calculate the correlation function, and the results are integrated for 72 channel bits by an integrator. If no noise exists, the integration results are 72 on the upper left hand side of FIG. 1(a), 0 (lower left), 36 (upper right), and 36 (lower right). Therefore, it is possible to determine that a waveform is the waveform 1 when the integration result is between 18 and 54 or the waveform 0 when the result is otherwise. This is a process of the so-called maximum likelihood method whereby the most likely waveform is determined such that the reliability against noises is extremely high.

A similar result can be obtained by setting the binarized data as 1 and −1 and by multiplying the binarized signal by the binarized waveform instead of the above-mentioned exclusive OR. In this case, the multiplication and summation results become 72, −72, 0, 0 such that we can determine the reproduced waveform as 1 when the output of the discriminator circuit 428 is −36 to +36, and otherwise as 0.

The wobble waveform data detected as mentioned above is processed by the address bit detector circuit 43 to determine the kind of wobble sequence, and at the same time synchronization is performed on the address bit to detect the address bit.

Figure 12B:
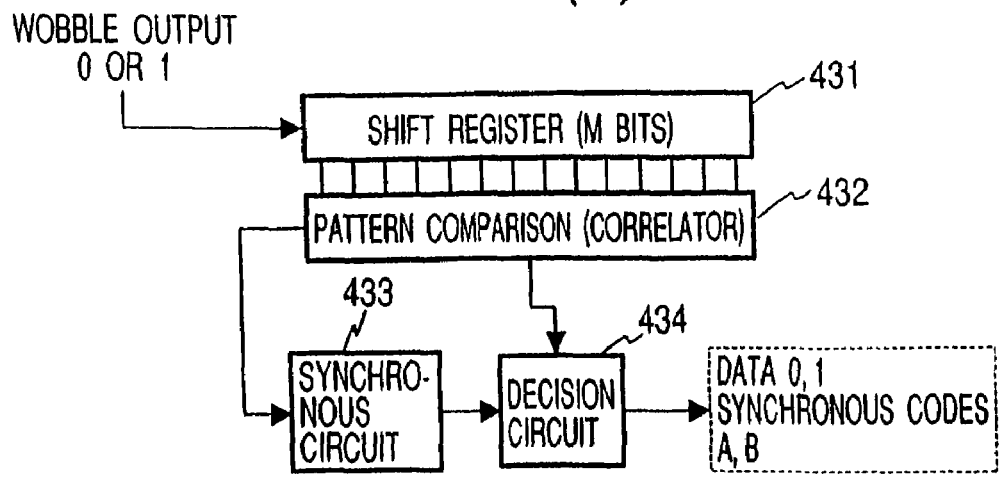

FIG. 12(b) shows the configuration of the address-bit detecting circuit.

Outputs 0,1 from the wobble detection circuit are input to the 31-bit shift register 431 and then compared with four kinds of patterns of the FIG. 6 one by one. In this case, comparing the pattern to the 31-bit data with 0 shift is the same as the correlation function of FIG. 7. Since one of the four kinds of patterns appears each time when the 31-bit data is input, the correlation function has a pulse-like peak at every 31 bits. Therefore, "almost synchronization" is determined when the correlation function exceeds a certain threshold (e.g., 27) and "synchronization" is finally determined thereafter when the correlation function exceeds the value of 27 after 31 bits pass through the synchronous circuit. In other words, the 31-bit period incurs between the "almost synchronization" stage and the "synchronization" stage. In addition, performance and reliability of the synchronization is further increased by introducing a switch of processing modes as follows: (1) before the establishment of the synchronization, a "continuity" processing mode in which the threshold is set at a relatively low value but the synchronization is determined to be established only when three or more consecutive synchronization pulses have been detected, and (2) after the establishment of the synchronization, a "window" processing mode in which the threshold is set at a low value but any pulses occurring at a time other than specified times spaced by 31 bits from the time of the initial synchronizing pulse are ignored or the threshold is set high for such pulses or the like.

Though there are four types of patterns, whether it is the synchronous code or the data can be determined once either pattern A or B is detected and the synchronization to the synchronous frames (FIG. 8) are established. The data 0 and the data 1 are completely reverse to each other (complimentary), and the distance between the patterns (Hamming distance) is 31 bits. Soft decision method is applied to decide the data 1 or the data 0. Soft decision only uses a fact of which one of the data 1 and the data 0 is closer to the result, namely, the decision by higher degree of similarity. Consequently, the probability of erroneous detection of the address bit is reduced considerably. Here, assuming that the erroneous detection rate of the unit wobble waveform is 1%, the erroneous detection rate of the address bit becomes $10^{-50}$ or less. As an extreme example, assuming that the erroneous detection rate of the unit wobble waveform is as bad as 5% (the worst condition), the erroneous detection rate of the address bit is at the order of $10^{-14}$ which ensures practically sufficient high reliability.

The detected address bit is subjected to address data decoding, such as error decision etc., at the decoder circuit 46 and further to error correction and decision processing (on the additional data).

The error correction processing on the additional data may be performed by a microprocessor for convenience.

Embodiment 3

Figure 2:
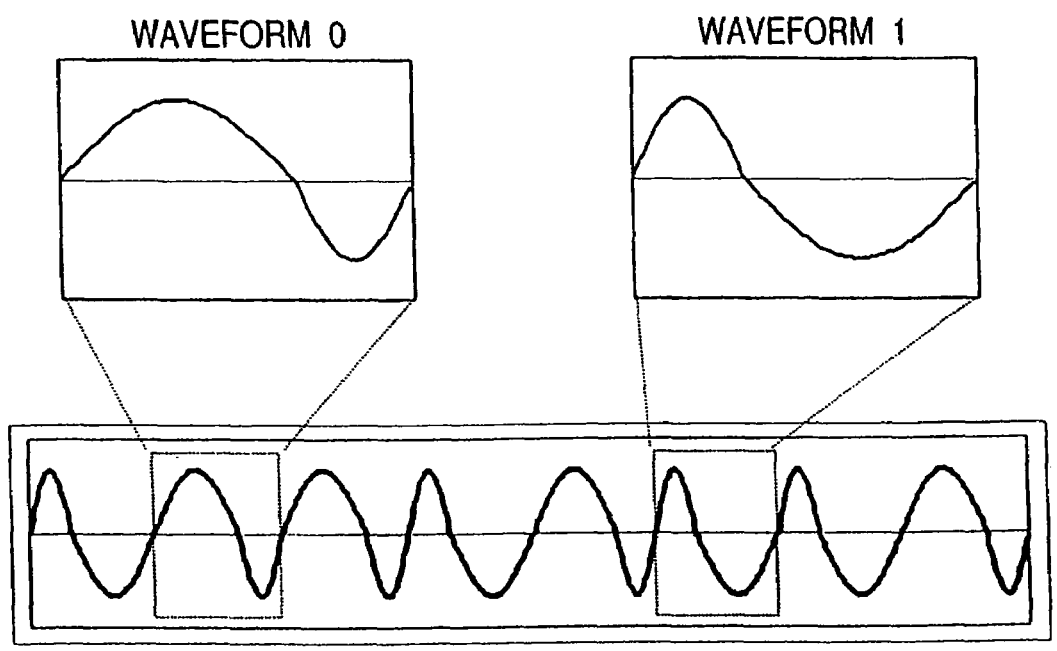
FIG. 2 shows the wobble waveform according to the embodiment of the present invention in FIG. 1.

Another embodiment according to the present invention will be described referring to FIG. 2.

This embodiment differs from the embodiment 1 in the unit wobble waveform. In the embodiment 1, the unit wobble waveform is composed of 1-period high-frequency component and half-period low-frequency component, whereas in this embodiment unit wobble waveform is composed of half-period low-frequency component and half-period high-frequency component. In this example, different from the embodiment 1, the frequency ratio of the high-frequency component and that of the low-frequency component is 1:1. The feature of the wobble according to this embodiment is that the front edges are always located at both the front end and the rear end of the unit wobble waveform which positions do not change at all regardless of the address data. Therefore, the wobble period of the unit wobble waveform is 1 period regardless of the recording waveform. The reproduction of waveform according to the present invention includes, for example, a method of confirming the existence of the edge shown in FIG. 3 and a method of using a value obtained by integrating the value of exclusive OR with the reference waveform, which is identical to the embodiment 2, for the length of the unit wobble waveform in FIG. 4.

Figure 3:
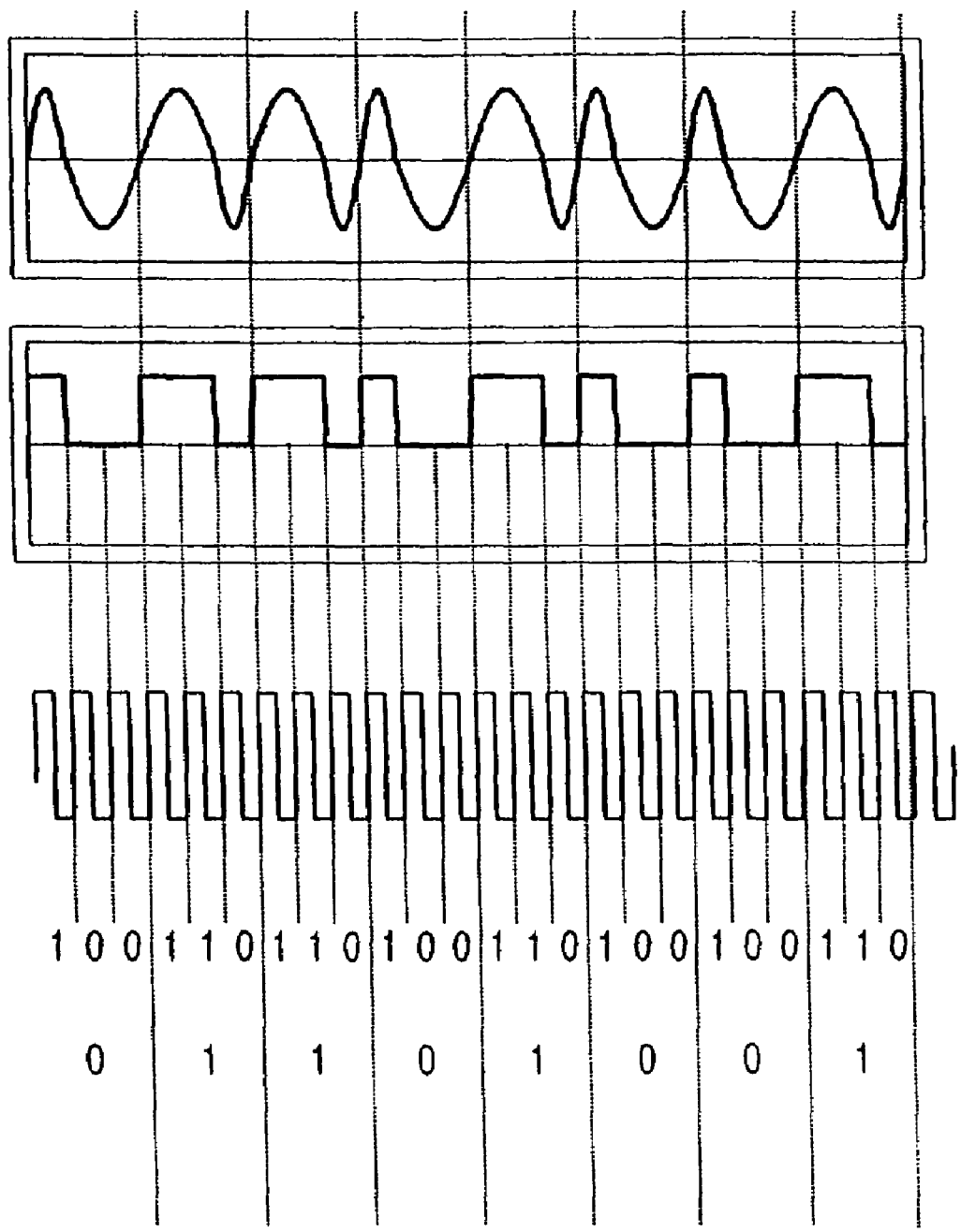
FIG. 3 shows an example of a reproduction system of the wobble waveform according to the embodiment of the present invention in FIG. 1.

In the case of the method in FIG. 3, a recording/reproduction clock such that the length of the unit wobble waveform equals to three periods of the generated data, and the binarized data is detected at a time interval of the said clock. In FIG. 3, the binarized data is reproduced, for a unit of 3 channel bits such that "100" is converted into "0" and "110" is converted into "1."

Figure 4:
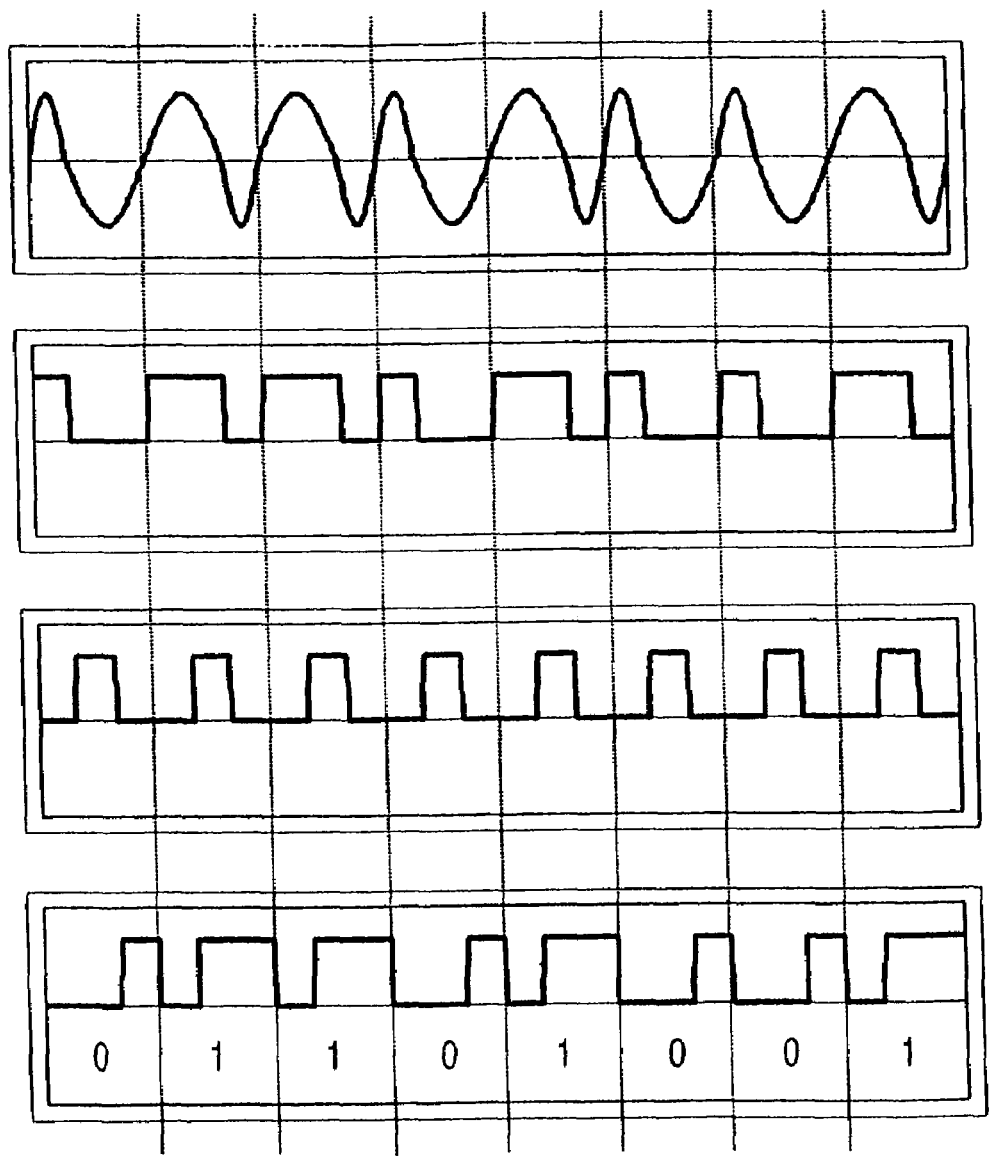
FIG. 4 shows another example of a reproduction method of the wobble waveform according to the one embodiment of the present invention in FIG. 1.

The method in FIG. 4 of the embodiment 3 is almost the same as the embodiments 1, 2. The address data is also detected by checking the duty cycle of the result of exclusive-OR processing (in the bottom row) on the binarized data (in the second row, also in FIG. 2) and the reference data (in the third row).

Figure 5:
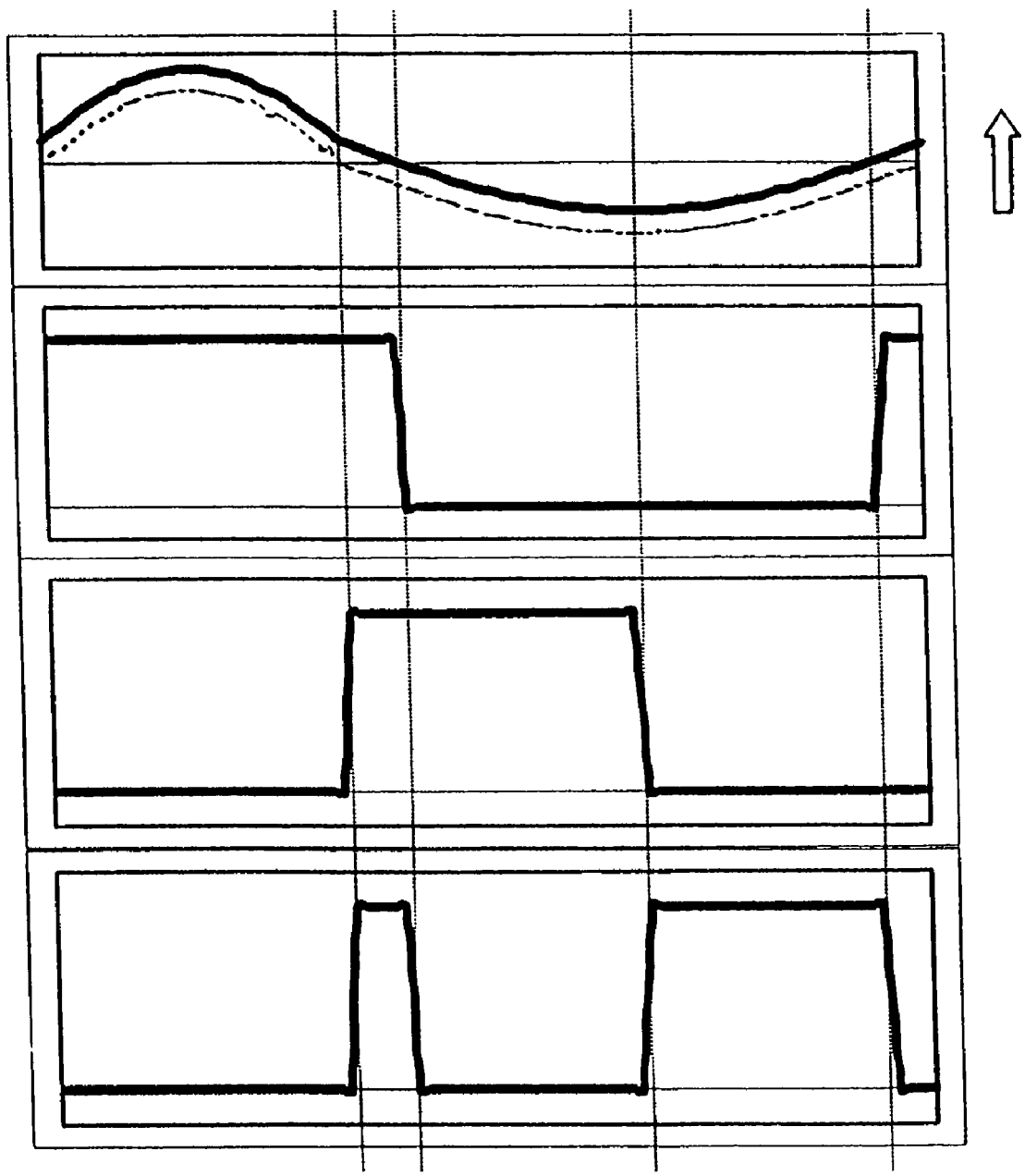
FIG. 5 illustrates an effect of the reproduction system of the wobble waveform according to the present invention.

FIG. 5 shows the detecting scheme of FIG. 4 being robust against DC variation of the wobble signal. When a DC level of a raw signal (the uppermost row) varies, although the duty ratio of the binarized signal changes, the duty cycle exhibits almost no change by virtue of exclusive-OR processing on it and the reference signal (in the third row). That is, it is robust against to the low-frequency fluctuation of the reproduced (wobble) signal. This indicates that it exhibits high resistance to dominant fluctuation (noise), such as leakage of the recording data during data recording or after the data recording and cross talk of the wobbles of the adjacent track.

Embodiment 4

Figure 13:
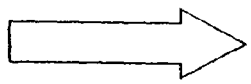
FIG. 13 shows an example of compositions of the wobble sequences according to the present invention.

FIG. 13 shows an example where three kinds of M-sequences are used as the wobble sequences according to the present invention and each of the said M-sequences is subjected to bi-phase modulation. For example, if this method is applied to a unit wobble waveform with a DC component as in the embodiment 3, the DC component can be diminished to zero, and consequently the influences upon the reproduced signal and the servo signal are effectively eliminated.

The unit wobble waveform of FIG. 1 seems to have the DC component at first glance. However in a case of the example of FIG. 1, since the unit wobble waveforms each of which has two pairs of unit wobbles and is different from each other such that the DC component are repeated alternately, the DC component is not generated.

Figure 14:
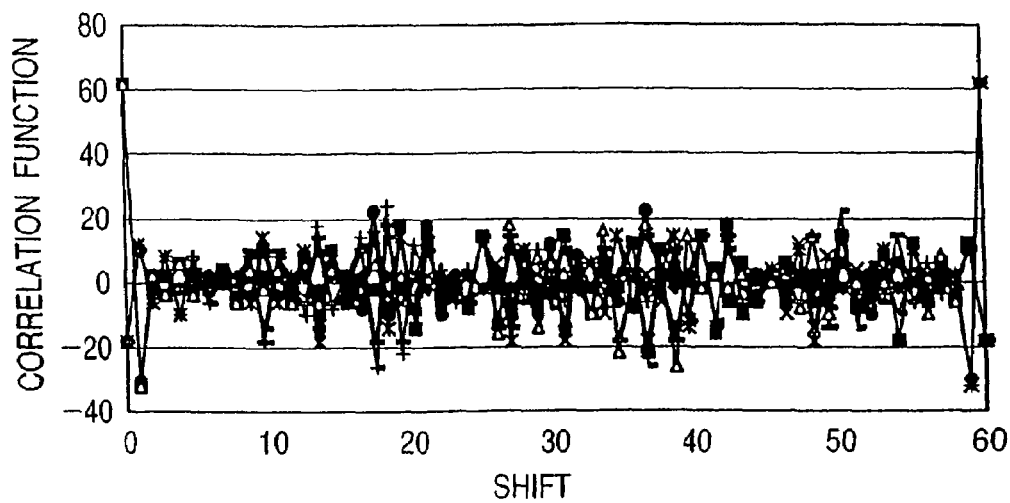
FIG. 14 shows the selfcorrelation function and the cross-correlation function of the wobble sequence.

FIG. 14 shows the cross-correlation of the sequences of FIG. 13, which exhibits excellent cross-correlation characteristics.

Embodiment 5

Figure 15:
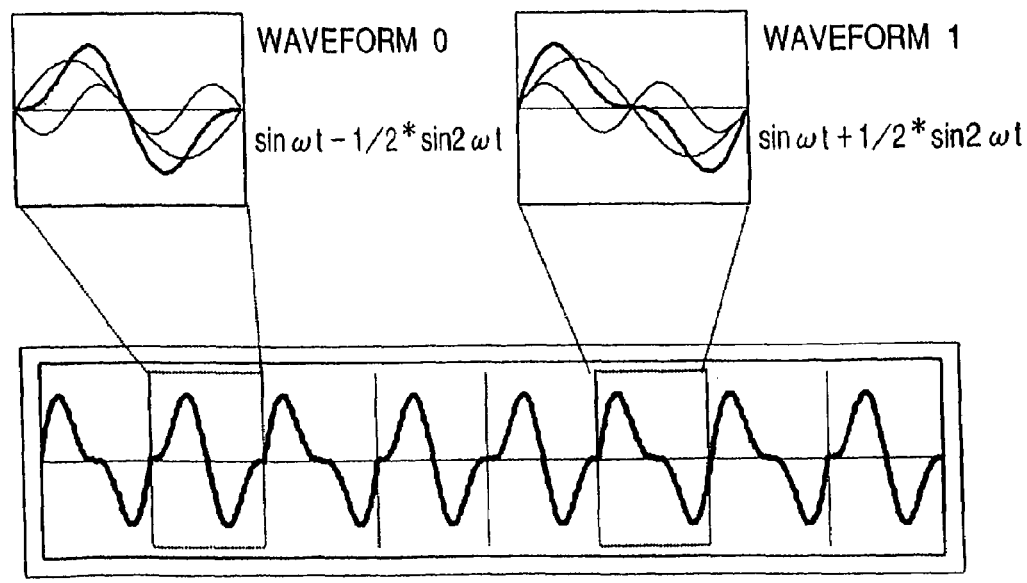
FIG. 15 shows an example of a composition of the wobble sequence according to the present invention.
Figure 16:
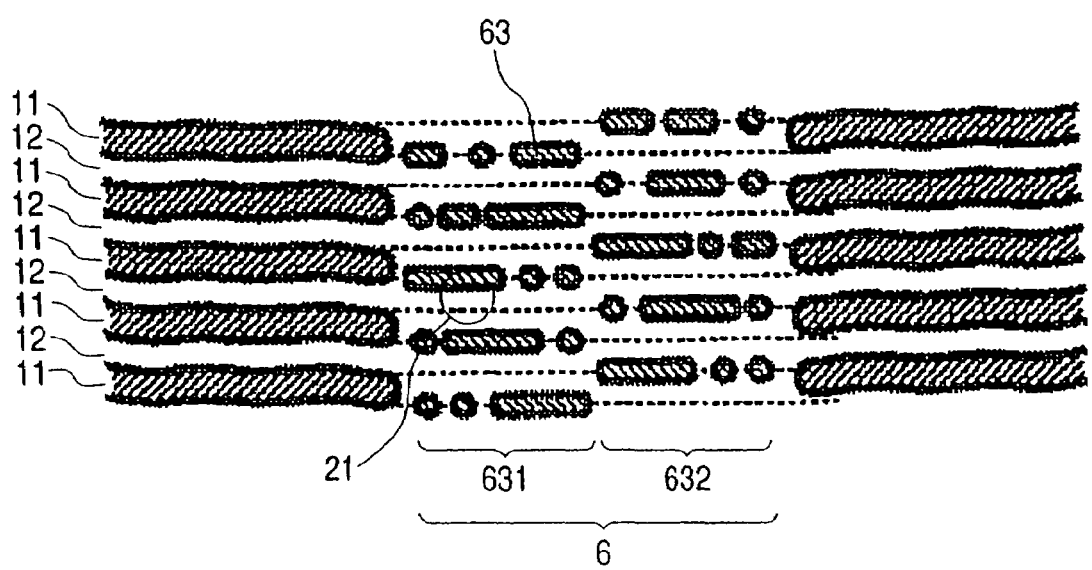
FIG. 16 shows the conventional optical disk format.

The unit wobble waveform of another embodiment according to the present invention is shown in FIG. 15. The wobble of this embodiment is formed by superposing 180-degree phase-modulated waveform with an angular frequency of $2\omega$ on the unmodulated fundamental waveform with an angular frequency of $\omega$.

Since the unmodulated component and the modulated component can be separated with a suitable bandpass filter and a stable clock generated from the modulated component can be used in reproducing the modulated component, this method is superior to the prior art in synchronization characteristics and address information reproduction characteristics.

The optical disk according to the present invention can easily establish the synchronization to the address signal in the wobble address system that is advantageous in the format efficiency so as to reproduce the address signal fast. Moreover, due to the efficient modulation system of the address signal and its redundancy, the address information can be detected with high reliability. This effect is particularly effective in the optical recording/reproduction performed with the blue light source whose signal light quantity and reproduction quality are prone to reduce. Moreover, the wobble is specified to preserve other additional data in addition to the address information so as to provide medium information to the rewritable optical disk without using the embossed pits. As such, a high-reliability disk (with enhanced security) can be realized at a low cost and easily. The preservation of the additional data by the wobble has been realized only after the introduction of the wobble with high detection efficiency according to the present invention.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An information recording apparatus for recording information to an optical disk having a groove group including one or more spiral grooves and an inter-groove group including one or more lands defined by the grooves, at least one of which constitute an information recording area,
    wherein at least one of the groove group and the inter-groove group is wobbled in the radial direction, a plurality of wobbles form an address codeword for identifying the information recording area, and a plurality of wobble sequences for synchronization are placed in said address codeword.

2. An information recording apparatus according to claim 1, wherein the address codeword is divided and placed in a plurality of synchronous frames that are partitioned by wobble sequences for synchronization.

3. An information recording apparatus according to claim 1, wherein
    the address codeword has additional data other than address information of the information recording area, and
    plural pieces of additional data placed in a plurality of address codewords are integrated to form a code block for correcting errors of the additional data.

4. An information recording apparatus according to claim 3, wherein the additional data include control information for protecting address data or cryptographic key information for restricting accesses to the address data.

5. An information recording apparatus according to claim 3, wherein, the additional data include control information specifying a type of disk and characteristics thereof.

6. An information recording apparatus according to claim 1, wherein
    the wobble sequences for synchronization comprises plural kinds of wobble sequences, and
    the plural kinds of wobble sequences are placed in the address codeword so as to specify a position in the address codeword with a difference in arrangement order of the plural kinds of wobble sequences placed in the address codeword.

* * * * *